(12) United States Patent
Barreh et al.

(10) Patent No.: US 10,346,173 B2
(45) Date of Patent: Jul. 9, 2019

(54) MULTI-THREADED INSTRUCTION BUFFER DESIGN

(75) Inventors: Jama I. Barreh, Austin, TX (US); Robert T. Golla, Round Rock, TX (US); Manish K. Shah, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 1459 days.

(21) Appl. No.: 13/041,881

(22) Filed: Mar. 7, 2011

(65) Prior Publication Data

US 2012/0233441 A1 Sep. 13, 2012

(51) Int. Cl.
*G06F 9/30* (2018.01)
*G06F 9/38* (2018.01)

(52) U.S. Cl.
CPC .......... *G06F 9/3851* (2013.01); *G06F 9/3814* (2013.01)

(58) Field of Classification Search
None
See application file for complete search history.

(56) References Cited

U.S. PATENT DOCUMENTS

| 6,988,186 B2 * | 1/2006 | Eickemeyer et al. ........ 712/217 |
| 7,383,403 B1 | 6/2008 | Barreh et al. |

| 2008/0195846 A1 | 8/2008 | Shen et al. |
| 2010/0005276 A1 | 1/2010 | Miwa |
| 2010/0100709 A1 | 4/2010 | Yoshida |
| 2010/0169624 A1 | 7/2010 | Yamamoto |
| 2010/0332800 A1 | 12/2010 | Sunayama |
| 2010/0332804 A1 | 12/2010 | Golla et al. |
| 2010/0333098 A1 | 12/2010 | Jordan et al. |

OTHER PUBLICATIONS

Shen et al.; Modern Processor Design: Fundamentals of Superscalar Processors; 2002; McGraw-Hill.*

* cited by examiner

*Primary Examiner* — Corey S Faherty
(74) *Attorney, Agent, or Firm* — Meyertons, Hood, Kivlin, Kowert & Goetzel, P.C.

(57) ABSTRACT

An instruction buffer for a processor configured to execute multiple threads is disclosed. The instruction buffer is configured to receive instructions from a fetch unit and provide instructions to a selection unit. The instruction buffer includes one or more memory arrays comprising a plurality of entries configured to store instructions and/or other information (e.g., program counter addresses). One or more indicators are maintained by the processor and correspond to the plurality of threads. The one or more indicators are usable such that for instructions received by the instruction buffer, one or more of the plurality entries of a memory array can be determined as a write destination for the received instructions, and for instructions to be read from the instruction buffer (and sent to a selection unit), one or more entries can be determined as the correct source location from which to read.

14 Claims, 7 Drawing Sheets

MULTI-THREADED INSTRUCTION BUFFER DESIGN

BACKGROUND

This disclosure relates to the execution of instructions in a multi-threaded computing environment, and, more specifically, to the use of instruction buffers in a multi-threaded environment.

A computer processor that supports two or more software threads uses various hardware structures to facilitate execution of instructions. An instruction fetch unit (IFU), for example, may retrieve instructions from cache and/or other memory structures of a computer system, and then pass those instructions down a pipeline to other hardware units for execution.

An IFU may have a pool of buffered instructions so that upon an indication that an instruction should be advanced for execution, the IFU is able to provide that instruction to an execution pipeline without actually having to fetch from cache. The size of this pool of buffered instructions may vary in accordance with the fetch latency of the IFU (i.e., the number of cycles it takes for the IFU to retrieve instructions from cache). A significant amount of chip space may be used by such a pool of buffered instructions.

SUMMARY

Techniques and structures are disclosed herein that relate to the use of instruction buffers that include memory arrays configured to store instructions. The memory arrays in such instruction buffers include multiple addressable entries (locations) in some embodiments. In one embodiment, instructions received at an instruction buffer can be stored at any entry within a memory array (or any entry within a portion of the memory array reserved for the use of a particular thread to which that instruction belongs). Likewise, in some embodiments, instructions can be read from any entry of a memory array in an instruction buffer (or any entry within a dedicated portion of the memory array). Instruction buffers described herein may function as a "combined buffer" for all (or some) of a plurality of threads that are supported by a processor—for example, by storing instructions for those threads within a same group of one or more memory arrays. In some embodiments, by storing instructions for a plurality of threads in one or more memory arrays, a reduced number of hardware structures and/or amount of chip space may be used to implement an instruction buffer. Reading from instructions buffers implemented using memory arrays may take one or more clock cycles, and may be pipelined in some embodiments.

In one embodiment, a processor includes an instruction buffer that is configured to store instructions for a plurality of threads. The instruction buffer is configured to receive incoming instructions from an instruction fetch unit and to provide outgoing instructions to an instruction selection unit. The instruction buffer in this embodiment also includes a first memory array comprising a plurality of entries, each of which is configured to store instructions executable by the processor. Further, in this embodiment, the processor is configured to maintain, for each of the plurality of threads, a first indicator that identifies one or more of the plurality of entries in which to store incoming instructions for that thread, and is also configured to maintain a second indicator that identifies one or more of the plurality of entries from which to read outgoing instructions for that thread.

The teachings of the disclosure, as well as the appended claims, are expressly not limited by the features and embodiments discussed above in this summary.

BRIEF DESCRIPTION OF THE DRAWINGS

The following detailed description makes reference to the accompanying drawings, which are now briefly described.

DETAILED DESCRIPTION

Figure 1:
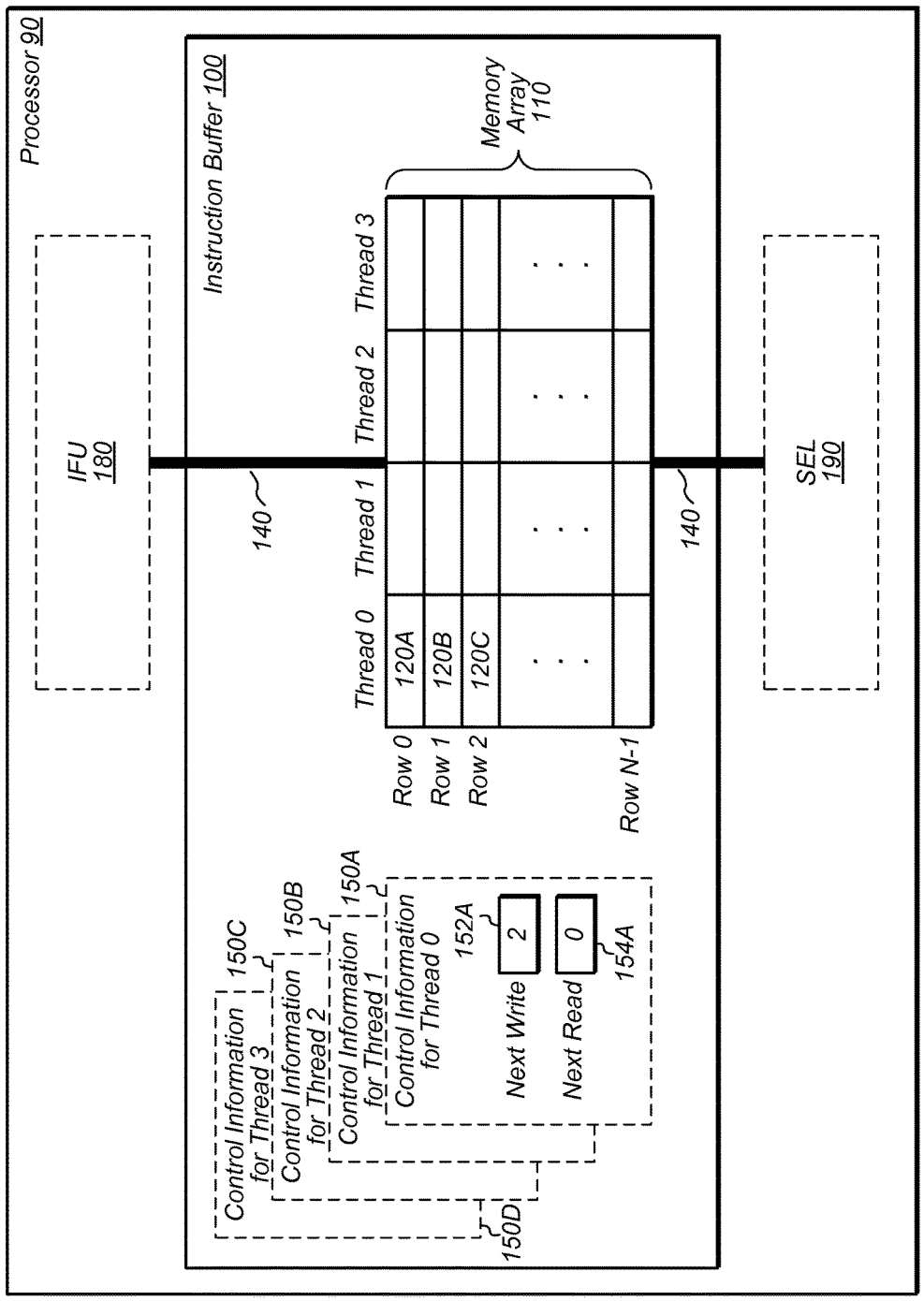
FIG. 1 is a block diagram illustrating one embodiment of a processor including an instruction buffer having a memory array.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner in one or more embodiments. Further, the phrases "in one embodiment" or "in an embodiment" are not restrictive in the sense that these phrases should be interpreted to be equivalent to the phrase "in at least one embodiment" (rather than reading these phrases as restricting a feature to only a single embodiment, for example).

Terminology. The following paragraphs provide definitions and/or context for terms found in this disclosure (including the appended claims):

"Thread." This term has its ordinary and accepted meaning in the art, and includes a series of one or more instructions that may be stored on a computer readable medium and that are executable by a processor.

"Memory Array." This term includes a hardware structure implemented within a processor and configured to store information in an addressable fashion. Thus, a memory array may include a hardware structure having at least two discrete locations (or entries) in which information may be arbitrarily accessed (stored to and/or read from). The term "memory array" does not include "storage arrays" such as an array of multiple hard disk devices located outside of a processor.

"Instruction Buffer." This term has its ordinary and accepted meaning in the art, and includes a hardware structure configured to store instructions executable by a processor. An instruction buffer may be configured to store other information in addition to instructions.

"Comprising" or "Including." These terms are open-ended. As used in the appended claims, these terms do not foreclose additional structure or steps. Consider a claim that recites: "an instruction buffer comprising one or more memory arrays . . . " Such a claim does not foreclose the instruction buffer from including additional components or structures (e.g., interface units, additional circuitry, etc.).

Additionally, where "memory arrays" or "instruction entries" are referred to as "each" including certain information or having a certain property or configuration, this does not preclude the existence of other, differently configured memory arrays and/or instruction entries that do not include the same certain information, or do not have the same certain property or same configuration.

"First," "Second," etc. As used herein, these terms are used as labels for nouns that they precede, and do not necessarily imply any type of ordering (e.g., spatial, temporal, logical, etc.). For example, in a memory array having eight entries, the terms "first" and "second" can be used to refer to any two of the eight entries. In other words, the "first" and "second" entries are not limited to logical or physical hardware entries 0 and 1.

"Based On." As used herein, this term is open-ended, and is synonymous with the phrase "based, at least in part, on" (unless specified otherwise). Thus, if one action is said to be caused "based on" another particular action, or "based on" some particular information, this does not imply that action cannot also occur based, at least in part, on other actions and/or other information.

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. Further, "configured to" may include adapting a manufacturing process (e.g., a semiconductor fabrication facility) to fabricate devices (e.g., integrated circuits) that are adapted to implement or perform one or more tasks.

"Processor." This term has its ordinary and accepted meaning in the art, and includes a device that includes one or more instruction execution units. A processor may refer, without limitation, to a central processing unit (CPU), a co-processor, an arithmetic processing unit, a graphics processing unit, a digital signal processor (DSP), etc.

"Computer" or "Computer System." This term has its ordinary and accepted meaning in the art, and includes one or more computing devices operating together and any software or firmware stored thereon. A computing device includes one or more processors and a memory subsystem. A memory subsystem may store program instructions executable by the one or more processors to perform various tasks.

"Computer-readable Medium." As used herein, this term refers to a non-transitory, tangible medium that is readable by a computer or computer system, and includes magnetic, optical, and solid-state storage media such as hard drives, optical disks, DVDs, volatile or nonvolatile RAM devices, holographic storage, programmable memory, etc. The term "non-transitory" as applied to computer readable media herein is only intended to exclude from claim scope any subject matter that is deemed to be ineligible under 35 U.S.C. § 101, such as transitory (intangible) media (e.g., carrier waves), and is not intended to exclude any subject matter otherwise considered to be statutory.

Turning now to FIG. 1, a block diagram is shown illustrating one embodiment of a processor 90 that includes an instruction buffer 100. Processor 90 may be any processor configured to execute instructions for a plurality of threads, and may include any number of processor cores, execution units, or other hardware structures designed to support execution of instructions for the plurality of threads. As just one example of some of the structures and techniques that may be used in such a processor, see U.S. patent application Ser. No. 12/652,641 and/or U.S. patent application Ser. No. 12/494,532, both of which are herein incorporated by reference in their entirety. In the embodiment shown in FIG. 1, four threads are supported processor 90, while in another embodiment, eight threads are supported. Various embodiments of processor 90 support greater or fewer numbers of threads.

Instruction buffer 100 is configured to receive incoming instructions from an instruction fetch unit 180 in the embodiment of FIG. 1, and is also configured to provide outgoing instructions to an instruction selection unit 190 in this embodiment. Instruction buffer 100 may thus serve to "decouple" IFU 180 from SEL 190. In addition to instructions, other data may also be received, stored, and/or provided by instruction buffer 100. (Further, as used in this disclosure, the terms "instruction" and "instructions" may refer to additional accompanying data (such as a program counter address for an instruction, for example), even if not explicitly mentioned.)

Instruction fetch unit 180, from which instruction buffer 100 is configured to receive instructions, may have any number of configurations in various embodiments, as would occur to those with skill in the art of processor design. In some embodiments, IFU 180 includes one or more features of the embodiment(s) of the instruction fetch units described in the '641 and '532 applications. Likewise, instruction selection unit 190, to which instruction buffer 100 is configured to provide instructions, may have various configurations as would occur to a person with skill in the art of processor design. In some embodiments, SEL 190 includes one or more features of the embodiment(s) of the selection units described in the '641 and '532 applications.

Instruction fetch unit 180 includes all or a portion of instruction buffer 100 in some embodiments. In other embodiments, instruction selection 190 unit includes all or a portion of instruction buffer 100. Thus, instruction buffer 100 may be located either wholly or partially within the circuitry that comprises IFU 180 and/or SEL 190. In yet further embodiments, instruction buffer 100 may be located wholly outside of both IFU 180 and 190. (Note: in embodiments in which instruction buffer 100 is wholly located within an instruction fetch unit, references to the instruction fetch unit may be considered as referring to the (other) portions of the instruction fetch unit that do not include instruction buffer 100.) Thus, in some embodiments, an instruction buffer may be said to "receive incoming instructions from an instruction fetch unit" even when all or a portion of that instruction buffer is implemented within the IFU. Further, an instruction buffer may be said to "provide outgoing instructions to an instruction selection unit" even when all or a portion of that instruction buffer is implemented within a unit such as 190.

In the embodiment of FIG. 1, instructions (and other accompanying information such as predecode bits and instruction addresses) may arrive at instruction buffer 100 via a first bus 140. Similarly, outgoing instructions may be sent via a second bus 140. Each bus 140 may be configured the same or configured differently, and includes suitable wiring, circuitry, and/or accompanying control logic as would be known to one with skill in the art in order to facilitate transport of instructions (and other data) into out and out of instruction buffer 100. (Thus in one embodiment, each bus 140 includes one or more word lines.) In some embodiments, busses 140 may be connected to other structures within processor 90 (e.g., bypass mechanisms, memory control logic, trap units, etc.).

Various timing schemes may be used to communicate data from IFU 180 to an instruction buffer. In some embodiments, anywhere between one and some greater number of instructions may be received by buffer 100 (and written to memory array 110) in a single clock cycle. Therefore in one embodiment, anywhere from between one and four instructions may be received by buffer 100 in one clock cycle. Groups of one or more instructions may also be received at intervals of two or more clock cycles in some embodiments. However, the manner in which instruction buffer 100 receives instructions from IFU 180 is not thus limited, and in various embodiments, any number of instructions (or none at all) may be received in a given clock cycle. In one embodiment, instructions for only one thread are received by buffer 100 in one clock cycle, while in other embodiments, instructions for two or more threads may be received within one clock cycle. An indication of which thread(s) correspond to instructions being received is also provided to instruction buffer 100 in some embodiments (for example, by IFU 180, SEL 190, or other structures within processor 90). Instructions may similarly be sent from instruction buffer 100 to SEL 190 in accordance with any of the timing schemes described above (or any other scheme as would occur to one with skill in the art).

As shown in FIG. 1, instruction buffer 100 comprises a memory array 110 that includes a plurality of entries 120. Thus, in the embodiment of FIG. 1, an entry 120 exists at each row location for each one of threads 0-3, even where not explicitly labeled. Memory array 110 may be physically configured in any manner as would occur to one with skill in the art of processor design. In some embodiments, memory array 110 is arranged as groups of flip-flops linked in parallel or in series, where each entry 120 comprises one of the flip-flop groups. In these embodiments, the groups of flip-flops are interconnected by various control wires and structures that allow a particular flip-flop group (i.e., a particular entry 120) to be accessed (i.e., read from or written to). In some embodiments, one or more write bypass mechanisms may be used to carry incoming write information directly to one or more outgoing data lines (thus preventing stale data from being used, for example, in the event that a particular entry 120 is being both written to and read from in the same clock cycle, particularly when memory array 110 is of a read first, write second variety). In one embodiment, memory array 110 is a single-ported array for both reads and writes. In other embodiments, array 110 may be multi-ported for reads, writes, or for both.

As depicted in FIG. 1, memory array 110 is four entries wide (corresponding to the four supported threads 0-3) and is N entries deep. However, memory array 110 need not be configured as shown. For example, memory array 110 could be designed as a single column of entries 120, where entries in rows 0 to N−1 correspond to a first thread, entries in rows N to 2N−1 correspond to a second thread, etc. The physical layout of memory array 110 is thus not limited. Many various configurations are possible, and might be chosen depending on the number of threads executable by a processor and/or depending on the number of entries provided (or reserved) for the use of each of the plurality of threads.

Each of entries 120 is configured to store an instruction for one of the threads executable by processor 90. In the embodiment of FIG. 1, entries 120 include storage capacity for one instruction; however, in other embodiments storage capacity for two (or more) instructions may be provided in a single entry 120. Entries 120, in addition to being configured to store one or more instructions, may include additional information in various embodiments. The information stored by entries 120 will be discussed further below relative to FIG. 2. Each one of entries 120 may be identically configured, or differently configured, within a same memory array 110, depending on the embodiment.

Entries 120 in memory array 110 may be accessed using a set of control information 150. Processor 90 is variously configured in different embodiments to maintain, for each of a plurality of threads, an indicator (such as next write pointer 152) that identifies one or more of the plurality of entries 120 in which to store incoming instructions for that thread. In various embodiments, "maintaining" an indicator includes accessing and/or updating the indicator. In one embodiment, maintaining an indicator includes reading the indicator to determine one or more memory array locations within an instruction buffer to store one or more instructions arriving at an instruction buffer, and subsequently updating the indicator to be reflective of the changed status of the memory array(s).

In the embodiment of FIG. 1, control information 150 exists in the embodiment of FIG. 1 for each thread that is supported by processor 90. (Note: as used herein, a thread is "supported by" a processor if the processor is configured to execute instructions for such a thread.) In this embodiment, control information 150 for a given thread includes a first indicator that identifies one or more of the plurality of entries 120 in which to store incoming instructions for that thread. This indicator may be any information specifying a location of one of entries 120 for the given thread, or any information usable to determine such a location. Thus, an indicator may be said to "identify" an entry even in embodiments when additional information may be necessary to more specifically determine the location of that entry in a memory array. Broadly, the terms "indicator" and "indication" may refer to one or more pieces of data or information (which may be stored in hardware logic such as transistors and/or on other computer readable media. Thus, an "indicator" may be a series of one or more stored bit values, for example.) As depicted in FIG. 1, an index pointer 152 serves as an indicator that identifies a "next write" location for one or more instructions corresponding incoming from IFU 180. Thus in this embodiment, when one or more instructions arrive from IFU 180 for a given thread, they are written into memory array 110 starting at the entry 120 indicated by the next write pointer 152 for that thread. As shown in FIG. 1, the next arriving instruction for thread 0 should be written to an entry in row "2" (and thus, should be written to entry 120C in the first column of memory array 110). In various embodiments, the first indicator described above is maintained by hardware structures within processor 90 and/or instruction buffer 100, and updated as needed. Write operations for instructions received from IFU 180, including maintaining/updating an indicator identifying where to store incoming instructions, will be described in greater detail further below.

Control information 150 may also include a second indicator that identifies one or more of the plurality of entries 120 from which to read outgoing instructions for a given thread. This second indicator may be any information specifying a location of one of entries 120 for the given thread, or any information usable to determine such a location. In the embodiment of FIG. 1, an index pointer 154 serves as an indicator that identifies a "next read" location. The next read location in this embodiment is an entry in memory array 110 that contains an instruction that has not yet been sent from instruction buffer 100 to SEL 190. As shown in FIG. 1, "next read" pointer 154A indicates that the instruction stored in entry 120A (row 0 for thread 0) has not yet been sent to SEL 190 (but was previously received from IFU 180). Based on an indication (which may be internally generated by buffer 100 and/or received from other hardware structures such as IFU 180 and/or SEL 190) that a next instruction for thread 0 should be sent to SEL 190, the instruction stored in entry 120A will be read from memory array 110. This instruction will then be transmitted to SEL 190. In some embodiments, in response to an indication that a next instruction for a given thread should be sent to SEL 190, two or more instructions will be read from memory array 110. Further, in some embodiments, an indication that a variable number of instructions should be sent to SEL 190 will cause instruction buffer 100 to read one or more instructions from memory array 110. For example, an indication might specify that two, three, or some other number of instructions is to be read for a given thread. In some embodiments, an indication that a number of instructions should be sent to SEL 190 may indicate that a fixed number of instructions (e.g., two) should be sent during one kind of operational mode, while in another kind of operational mode, a specified variable number or different fixed number of instructions will be sent. In some embodiments, an indication that a next instruction should be sent to SEL 190 may refer to two or more threads.

Depending on the embodiment, and on the nature of the next-instruction indication received by (and/or generated by) instruction buffer 100, one or more instructions for one or more threads are read out from memory array 110 and transmitted to SEL 190 in response. This reading (and transmission) process may take a different number of processor cycles in various embodiments. Thus, in one embodiment, in response to a next-instruction indication, two instructions for a first thread may be read from array 110 and transmitted to SEL 190 in a single processor cycle. In another embodiment, in response to a next-instruction indication, two instructions for a first thread may be read from array 110 and transmitted to SEL 190 in two processor cycles. In yet other embodiments, in response to a next-instruction indication, two instructions for a first thread and two instructions for a second thread may be read from memory array 110 and transmitted to SEL 190 in one, two, or some other number of processor cycles. Other variations are possible in other embodiments.

Figure 7:
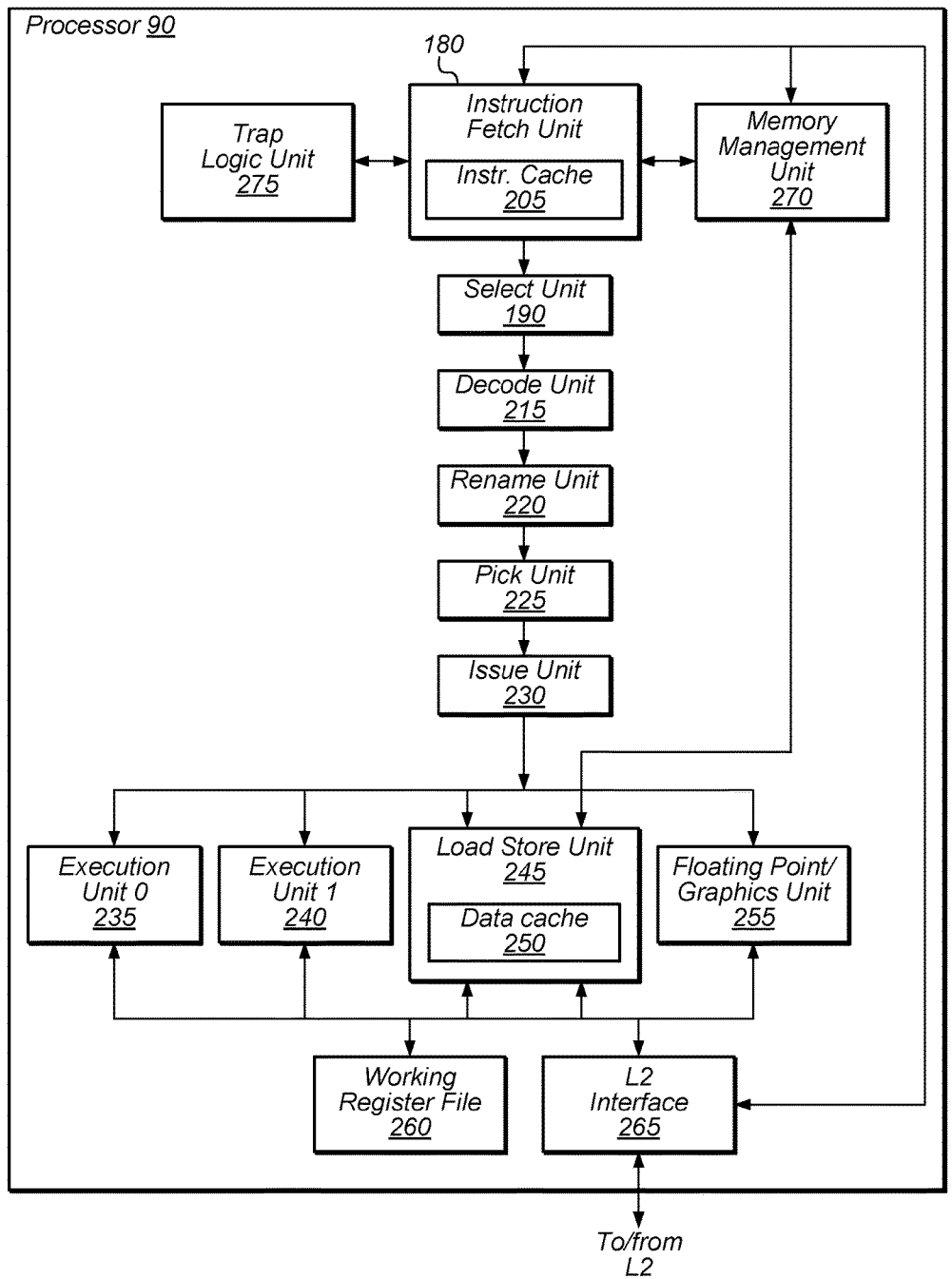
FIG. 7 is a block diagram illustrating one embodiment of a processor including a selection unit.

Turning now to FIG. 7, one embodiment of processor 90 that is configured to perform dynamic multithreading is illustrated. In the illustrated embodiment, processor 90 includes an instruction fetch unit (IFU) 180 that includes an instruction cache 205. IFU 180 is coupled to a memory management unit (MMU) 270, L2 interface 265, and trap logic unit (TLU) 275. IFU 180 is additionally coupled to an instruction processing pipeline that begins with a select unit 190 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

IFU 180 may be configured to fetch and maintain a buffered pool of instructions from one or multiple threads, to be fed into the remainder of the instruction pipeline for execution. Generally speaking, select unit 190 may be configured to select and schedule threads for execution. In one embodiment, during any given execution cycle of processor 90, select unit 190 may be configured to select up to one ready thread out of the maximum number of threads concurrently supported by processor 90 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 190, such as branch mispredictions, unavailable instructions, or other conditions. To ensure fairness in thread selection, some embodiments of select unit 190 may employ arbitration among ready threads (e.g. a least-recently-used algorithm).

The particular instructions that are selected for decode by select unit 190 may be subject to the decode restrictions of decode unit 215; thus, in any given cycle, fewer than the maximum possible number of instructions may be selected. Additionally, in some embodiments, select unit 190 may be configured to allocate certain execution resources of processor 90 to the selected instructions, so that the allocated resources will not be used for the benefit of another instruction until they are released. For example, select unit 190 may allocate resource tags for entries of a reorder buffer, load/store buffers, or other downstream resources that may be utilized during instruction execution.

Figure 2:
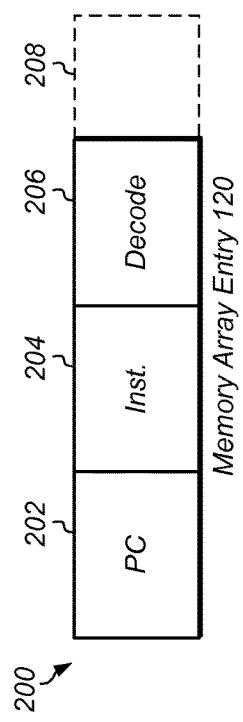
FIG. 2 is a block diagram illustrating one embodiment of an exemplary memory array entry, and the information that may be stored therein.

Turning now to FIG. 2, a block diagram 200 illustrating one embodiment of an exemplary memory array entry 120 is shown. In this embodiment, memory array entry 120 is configured to store a program counter (PC) 202, an instruction 204, and one or more decode bits 206. Other information 208 may also be stored in an array entry in various embodiments. PC 202 is a program counter address corresponding to instruction 204. Instruction 204 is an instruction that is in a format executable by processor 90, and may be 64 bits wide, 32 bits wide, or any other number of bits in width. The number and format of decode bit(s) 206 will vary in different embodiments according to the specifications of processor 90. In one embodiment, the total width of entry 120 is 120 bits. In some embodiments, PC 202 and/or decode bit(s) 206 are not stored in the same entry 120 as instruction 204, and may be stored in another entry or another structure. For example, in one embodiment, a parallel memory array may store PC 202 and/or decode bit(s) 206 in a different memory array entry, while in yet another embodiment, PC 202 and/or decode bit(s) 206 may be stored in some structure other than a memory array entry 120. The format of array entry 120 may thus vary in different embodiments, and PC 202, instruction 204, decode bit(s) 206, and other information 208 can be stored in any manner as would occur to one with skill in the art. It need not be the case, for example, that PC 202 is stored in a continuous series of bits immediately adjacent to another continuous series of bits that store instruction 204. In embodiments in which one or more portions of entry 120 are stored in one or more parallel memory arrays, the parallel memory arrays may have identical or similar configurations to a primary memory array, and may be read from or written to accordingly. Thus, in one embodiment, if an instruction 204 is being written to an entry in row 6, column 5, of a first memory array, an accompany PC and decode bit(s) are also written to another entry in row 6, column 5, of a second memory array.

Figure 3:
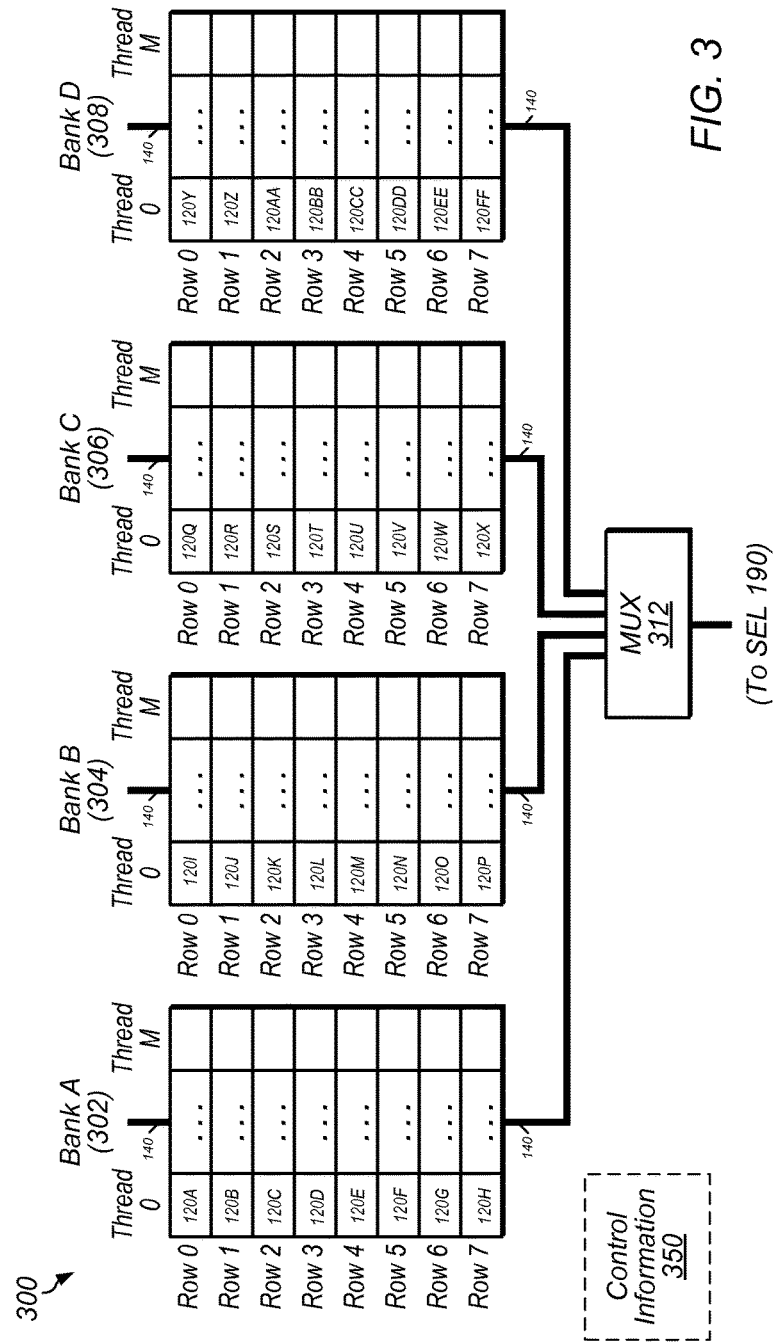
FIG. 3 is a block diagram illustrating one embodiment of an instruction buffer having a plurality of memory arrays.

Turning now to FIG. 3, a block diagram illustrating one embodiment of an instruction buffer 300 having a plurality of memory arrays 302-308 is shown. (These arrays are also labeled in the diagram as bank A, bank B, bank C, and bank D, respectively.) Arrays 302-308 can be configured (either individually and/or collectively as one or more groups of two or more arrays) to possess any of the features of the embodiments of memory array 110 as described above. As shown, each of arrays 302-308 is configured to store a plurality of memory array entries 120 for each one of a plurality of threads supported by processor 90. Thus, in the embodiment of FIG. 3, each of arrays 302-308 has M different portions (e.g., columns of the storage array), each having a respective plurality of entries 120. In this embodiment, each of the M portions is dedicated for use by a respective different one of the M supported threads. Thus, in the embodiment of FIG. 3, bank A has eight entries 120A-120H dedicated (i.e., reserved) for use by thread 0, bank B has eight entries 120J-120P dedicated for use by thread 0, etc. Memory arrays 302-308 are not thus limited, however, and in various embodiments include some other number of entries 120 per supported thread. In some embodiments, a different number of entries in each of the plurality of memory arrays may be reserved for use by different threads. (Thus, for example, in one embodiment, threads 0-3 might each have sixteen (16) entries reserved for their use in each of a plurality of memory arrays, while other supported threads may have eight (8) (or some lesser or greater number) entries reserved for their use.) In some embodiments, each of a plurality of memory arrays may differ in the number of entries 120 contained by that array (e.g., memory array 302 may have twelve (12) entries 120 per thread, while memory array 304 might have four (4) entries per thread). In yet further embodiments, one or more first memory arrays may be configured to store entries 120 for a first number of supported threads, while one or more second memory arrays may be configured to store entries 120 for a different, second number of supported threads. Thus in one embodiment, one or more first memory arrays may be configured to store entries 120 for threads 0-3, while one or more second memory arrays may be configured to store entries 120 for threads 4-7. In short, embodiments with multiple memory arrays (such as the embodiment of FIG. 3) may feature different (or the same) configurations for each of those memory arrays, individually or collectively, and within each memory array, different threads may have different numbers of entries 120 dedicated (reserved) for use by that thread.

Instruction buffer 300 is configured to receive instructions (and/or accompanying data) from IFU 180 in the embodiment of FIG. 3. These instructions may be received via one or more busses 140. As shown in FIG. 3, each of memory arrays 302-308 is connected to an individual bus 140, but in another embodiment, a shared bus may instead be used for two or more of a plurality of memory arrays. In one embodiment, up to four instructions (and other accompanying data) may be received and stored by instruction buffer 300 for a given thread within a particular time period (e.g., one processor clock cycle). In the embodiment of FIG. 3, four instructions for thread 0 might be received in a particular cycle and written to entries 120A, 120I, 120Q, and 120Y, for example. In other embodiments, a lesser or greater number of instructions for a given thread may be received and stored in entries 120 in a particular clock cycle. As previously noted, the amount of time (or cycles) in which a group of one or more instructions for a particular thread is received and stored may vary, and thus, in some embodiments, two or more clock cycles may be used to receive and write one or more instructions to one or more entries 120 within instruction buffer 300. In some embodiments with multiple memory arrays (banks), the starting bank for an instruction to be written may be determined based on a PC address for that instruction (thus, in one embodiment, the starting bank for an instruction to be written is determined by the least four significant bits of that instruction's address—for example, Bank D might be used in the embodiment of FIG. 3 if an address for an incoming instruction had least significant bits of '11'). Different schemes for determining memory array locations in which to store incoming instructions to an instruction buffer may be used in various embodiments as long as, given a state (for a particular thread) of the instruction buffer and/or memory arrays within the instruction buffer, locations for one or more additional incoming instructions for that particular thread can be determined.

Instructions received by instruction buffer 300 from IFU 180 may be stored in one or more entries 120 in accordance with control information that is maintained for one or more of the plurality of memory arrays 302-308. In the embodiment in FIG. 3, one or more sets of control information 350 exist that are usable to determine both next-write and next-read locations for any given one of supported threads 0 to M. These sets of control information 350 include, in some embodiments, data comprising control information 150 as described above. Thus in one embodiment, control information 350 includes a next write pointer and a next read pointer for each of supported threads 0 to M. These next write and next read pointers (or other information, in other embodiments) may be used to determine, in the embodiment of FIG. 3, one or more entries 120 within memory arrays 302-308 into which up to four instructions may be written in a given (or next) clock cycle for a given thread.

In a same time period (e.g., clock cycle or multiple thereof) in which one or more threads are reading from instruction buffer 300, one or more threads may also write to instruction buffer 300. Thus in one embodiment, thread 0 may write to an entry 120 during a time period in which thread 2 is reading from another entry 120. In some embodiments, multiple threads may read and write from instruction buffer 300 in the same time period. In the event that a same thread is both writing to and reading from one or more same entries 120 in the same time period, a bypass mechanism may be used to seamlessly forward the write values so that stale instructions and/or accompanying data are not sent to SEL 190. This bypass mechanism may be variously configured in accordance with the particular configuration of instruction buffer 300 in different embodiments, and may accommodate forwarding for a plurality of different threads within a same given time period or clock cycle.

Reading is performed down and across the rows of banks A-D in the embodiment of FIG. 3. Thus, if a read pointer (or other control information) indicates that entry 120M is the next starting location from which to read instructions for thread 0, for example, the next four instructions to be read for thread 0 may then come from row 4 (entries 120M, 120U, and 120CC) and row 5 (entry 120F). Reading from the plurality of memory arrays 302-308 may take one clock cycle, two clock cycles, or more, in various embodiments. In some embodiments, a determination as to which entry 120 should be read for a given thread may be made in response to an indication that instructions for that thread are requested by SEL 190 or should be sent to SEL 190. In the embodiment of FIG. 3, instructions read by buffer 300 (and/or accompanying data) may be provided to SEL 190 via one or more busses 140, which may be fed into a multiplexer (MUX) 312. In the embodiment of FIG. 3, because four instructions may be output from the four respective banks of buffer 300, but only up to two of these instructions may be provided to SEL 190 in a given clock cycle, MUX 312 makes a selection as to which bank(s) will have instructions forwarded. Depending on clock cycle, this selection may be based, for example, on decode bit(s) for the instructions and on an original starting entry 120 for the read operation. Thus, for example, the same instructions may be output from Banks A-D in each of two cycles based on a start location for a read; in the first cycle Banks A and B might be selected by the MUX, and in the second cycle banks C and D might be selected by the MUX.

Figure 4A:
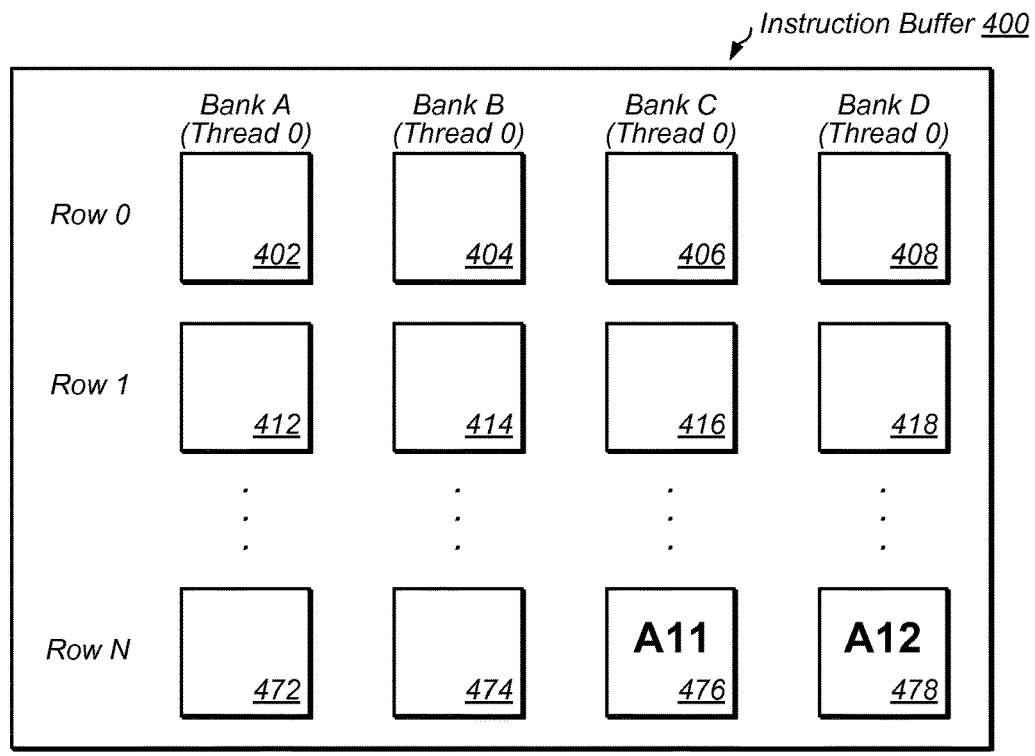
FIGS. 4A-4C are block diagrams illustrating portions of four memory arrays in an instruction buffer over a period of time.
Figure 4B:
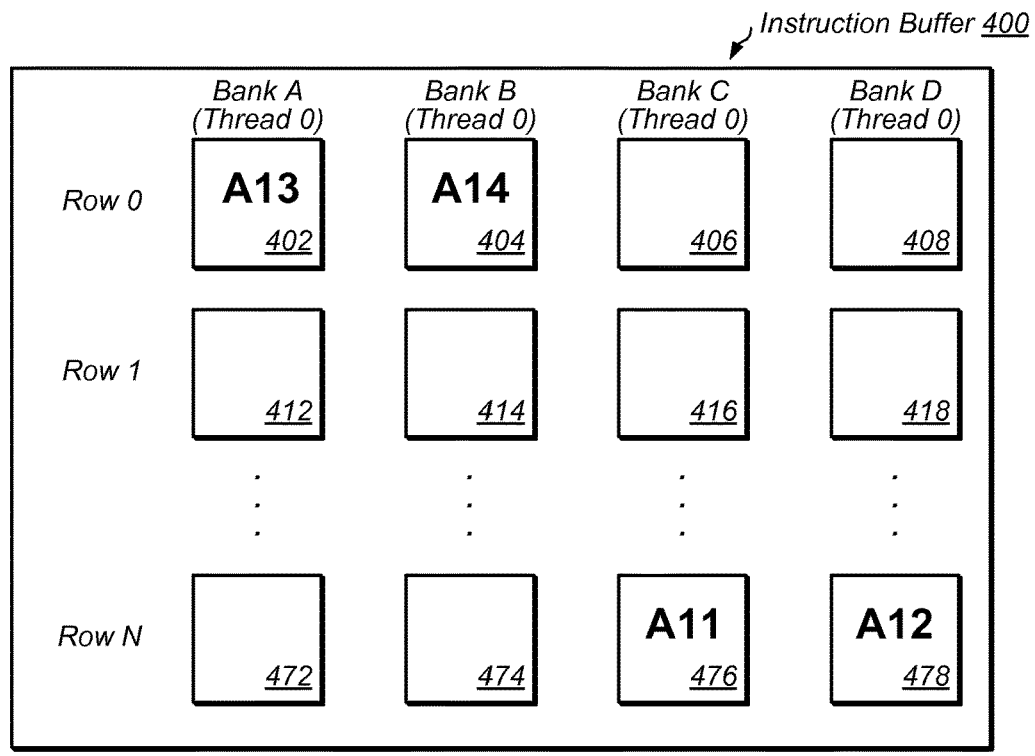
Figure 4C:
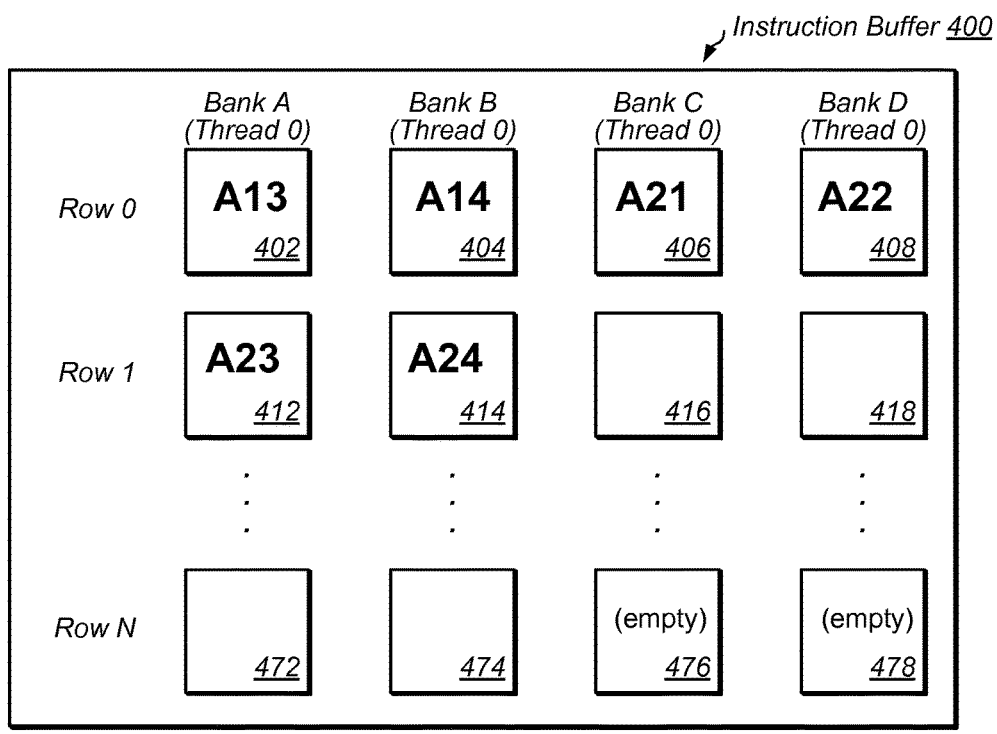

Turning now to FIGS. 4A-4C, block diagrams illustrating the contents of portions of four memory arrays are shown over a period of time (i.e., number of clock cycles) as instructions are being written. In these figures, the portions of instruction buffer 400 that are depicted are dedicated for use by a single thread (0), and include entries 402, 404, etc. Entries 402, 404, etc., each comprise a memory array entry with one or more features as described with respect to entry 120 and/or embodiment 200 above. Additionally, instruction buffer 400 may include any or all features of instruction buffers 100 and/or 300 as described above (note that portions of instruction buffer 400, such as those for use by threads other than thread 0, are omitted for purposes of illustration). As shown, instruction buffer 400 includes four banks, each of which has a total number of N+1 entries for thread 0.

In the embodiment of FIG. 4, control information (not shown) and/or the least significant bits of an instruction address (also not shown) indicate that one or more next-received instructions for thread 0 should be written to locations beginning at entry 476, in row N. During a first clock cycle in which instructions A11, A12, A13, and A14 are received at instruction buffer 400 from IFU 180, instructions A11 and A12 may thus be stored at entries 476 and 478. FIG. 4A accordingly depicts instruction buffer 400 with these first two instructions stored.

Arriving instructions A13 and A14 will also be stored. As shown in FIG. 4, entry 478 represents the entry in the last logical row of the last bank of buffer 400. Thus, writing may resume back at entry 402 (the entry in the first logical row of the first logical bank of buffer 400). Writing instructions into multiple entries spread across multiple banks (memory arrays) in instruction buffers such as 400 may therefore be handled using modulo arithmetic in some embodiments (by "wrapping around" entries during writing to a next bank and/or to a next row). In FIG. 4B, instruction buffer 400 is shown after entries for instructions A13 and A14 have also been stored, wrapping back to bank A and row 0 to accomplish the storage. (Note that while FIGS. 4A and 4B are shown separately, the storing of instructions A11-A14 may take place in a single clock cycle).

Turning to FIG. 4C, instruction buffer 400 is shown after the next instructions for thread 0 (A21, A22, A23, and A24) are received and stored in entries 406-414. Note that incoming instructions A23 and A24 are "wrapped around" down to the next logical row in buffer 400, and stored in entries 412 and 414. Further, in the embodiment of FIGS. 4A-4C, instruction buffer 400 is configured to send up to two instructions to SEL 190 in a clock cycle. Thus, during the second clock cycle in which instructions A21-A24 were received, earlier stored instructions A11 and A12 were read from entries 476 and 478 and sent out, leaving those entries empty (i.e., ready to be overwritten with fresh instructions and/or accompanying data).

Reads from instruction buffers may be pipelined in various embodiments (including those embodiments having one or more features in common with the ones discussed above with respect to FIGS. 1, 2, 3, and 4A-4C). Accordingly, the number of cycles it takes to read instructions from an instruction buffer and/or provide the instructions to SEL 190 may vary. The number of cycles needed to perform a read of an instruction buffer may depend, in various embodiments, on factors such as a maximum number of instructions that are deliverable to SEL 190 in a given cycle, a number of instructions that are readable from the instruction buffer via a single read operation, and the latency (number of cycles) that it takes to read from one or more memory arrays in the instruction buffer. As will be seen below, in pipelined reading, a processor may be configured to begin reading a group of one or more instructions from an instruction buffer prior to an earlier read being fully completed (e.g., having each one of a group of one or more instructions read from the instruction buffer to be sent to the instruction selection unit).

In some embodiments, timing issues may cause inefficiency in the absence of pipelined reading from an instruction buffer. For example, in one embodiment, two clock cycles are required to read from the instruction buffer, and SEL 190 is configured to receive up to two instructions per one cycle for a given thread. Thus, in this embodiment, if a read operation accesses two instructions from the instruction buffer at a time, and waits until a first read is complete before initiating a second read, a sequence of reads from the instruction buffer might look like the following:

Sequence 1
Cycle 1: Begin reading instructions A and B;
Cycle 2: Finish reading instructions A and B, and send to SEL 190;
Cycle 3: Begin reading instructions C and D;
Cycle 4: Finish reading instructions C and D, and send to SEL 190.

In the above sequence, because instructions are not sent to SEL 190 in cycles 1 and 3, the effective throughput of the instruction buffer would only be two instructions per every two cycles. By using pipelining reads from the instruction buffer, however, bandwidth may be increased. For example, in one embodiment in which reads are pipelined, a read operation accesses four instructions from buffer 300 at a time, and still take two cycles to complete. A read sequence in this embodiment might resemble:

Sequence 2
Cycle 1: Begin reading instructions A, B, C, and D;
Cycle 2: Finish reading instructions A, B, C, and D, Send A and B to SEL 190;
Cycle 3: Begin reading instructions E, F, G, and H, Send C and D to SEL 190 (using outputs of previous read);
Cycle 4: Finish reading instructions E, F, G, and H, Send E and F to SEL 190;
Cycle 5: Begin reading instructions I, J, K, and L, Send G and H to SEL 190 (using outputs of previous read).

Thus, in this read sequence, the effective throughput of instruction buffer 300 is four instructions per every two cycles, or two instructions per cycle (ignoring the initial startup costs of the first read in cycle 1 when no instructions were ready to send to SEL 190). Note that in the above example of sequence 2, in cycles 3 and 5, reading of a next group of instructions from the instruction buffer has commenced even while the remainder of a last group of instructions to be read is being sent to SEL 190. Thus, in some embodiments a memory array or instruction buffer may produce outputs of a previous read even while a next read operation has commenced. Results from previous read operations may also be temporarily stored elsewhere (e.g., outside of a memory array), in some embodiments, prior to sending instructions to SEL 190.

Variable numbers of instructions may be sent from an instruction buffer such as 300 or 400 to SEL 190 in different clock cycles in various embodiments. It may be the case that one or more downstream execution unit(s) are capable of handling two different simple instructions at the same time within one clock cycle, but for more complex (or lengthy) instruction types, only one instruction can be handled within a single clock cycle. Thus, in the event that a complex instruction is to be read from an instruction buffer, the instruction buffer might send only that single, complex instruction to SEL 190 for that clock cycle. In one embodiment, information such as decode bit(s) 206 that are stored in one or more array entries 120 are examined to determine whether one or two instructions will be sent to SEL 190 in a particular cycle. In this embodiment, if the decode bits or other information indicates a certain instruction type, only one instruction will be read and advanced. An example of a third read sequence for an embodiment featuring pipelined reads, as well as reads allowing variable numbers of instructions, appears below:

Sequence 3
  Cycle 1: Begin reading instructions A, B, C, and D;
  Cycle 2: Finish reading instructions A, B, C, and D, Examine decode bit(s), determine that instructions A and D should be sent to SEL 190 without accompanying instructions, Send instruction A (only) to SEL 190;
  Cycle 3: Begin reading instructions D, E, F, and G*, Send both instructions B and C to SEL 190 (based on a determination that instructions B and C can be sent in a same cycle);
  Cycle 4: Finish reading instructions D, E, F, and G, Examine decode bit(s), determine that instructions D and E should be sent to SEL 190 without accompanying instructions, Send instruction D (only) to SEL 190.
  Cycle 5: Begin reading instructions F, G, H, and I; Send instruction E (only) to SEL 190**. etc.

*Note that in cycle 3, the next read of the instruction buffer begins at the entry for instruction D rather than the entry for instruction E. This is because in the previous cycle, the decode bit(s) for instructions A-D were usable to determine that over the next two cycles, only instructions A, B, and C would be sent to SEL 190 (as instruction A could not be sent as part of an instruction pair, but instructions B and C could).
Further, note that in cycle 5, the read of instruction buffer 300** begins at the entry for instruction F rather than the entry for instruction G or H. This is because in previous cycle 4, the decode bit(s) for instructions E and F indicated that neither of those instructions could be sent as part of a pair, and thus over the next two cycles, only E and F would be sent.

As can be seen from sequence 3 above, in some embodiments, subsequent reads may dependent on feedback from earlier reads (particularly in embodiments allowing variable numbers of instructions to be sent to SEL 190 in one cycle). For example, for a read operation in the embodiment of sequence 3, four instructions may be sent to SEL 190 for a given thread over a period of two clock cycles, but a lesser number of instructions may also be sent. Control information for the instruction buffer in such an embodiment may accordingly be updated in accordance with a feedback mechanism indicating the exact number of instructions sent to SEL 190 in a previous cycle. For example, a next read pointer such as 154A might be updated to reflect that three (and not four) instructions were read and sent from an instruction buffer to SEL 190 in clock cycles 2 and 3 of exemplary sequence 3 above. In some embodiments where a read operation takes multiple cycles, feedback may also be used to determine a next instruction to be read and provided to SEL 190. For example, in sequence 3 above, instructions A, B, C, and D are all output during cycles 2 and 3 based upon a same starting read address used in cycle 1. In this example, feedback is used to indicate that only instruction A was sent in cycle 2; thus, the next instruction to be sent to SEL 190 in cycle 3 is instruction B.

Thus in summary, in one or more embodiments, in every cycle, instructions are decoded using special predecode bits from a memory array, and then based on the decode, the number of instruction that can be taken from the instruction buffer in one cycle are determined. In these embodiments, the number of instructions taken is based on decode rules for the instructions (for example, indications of whether instructions are simple, or are complex and/or lengthy). In these embodiments, when the number of the instructions to be taken is determined, this information may be fed back to a read-pointer such as 154A within a control information structure. Feedback in combination with a read address may also determine how to modify the read address to buffer for a next fetch. Accordingly, for a read operation taking multiple cycles, feedback from the last read operation as well as feedback from a previous cycle of the current read operation may be used to determine, in some embodiments, which of four instructions fetched from an instruction buffer are to be selected to be transmitted in a given cycle. (Note: as used above, "feedback" may refer, in some embodiments, to a (read) location within a memory array, an address corresponding to an instruction stored within a memory array, and/or a number of instructions that were previously sent to SEL 190 in one or more previous cycles.)

Pipelined reading of instructions from an instruction buffer (and/or one or more memory arrays within an instruction buffer) may be applied in any of the embodiments described above or below. Further, pipelined reading is not limited to the examples described above. Thus, although the above example of sequence 3 referred to an embodiment in which up to two instructions are sent to SEL 190 per cycle for a given thread, pipelining may be applicable when SEL 190 has different intake requirements or capabilities.

Figure 5:
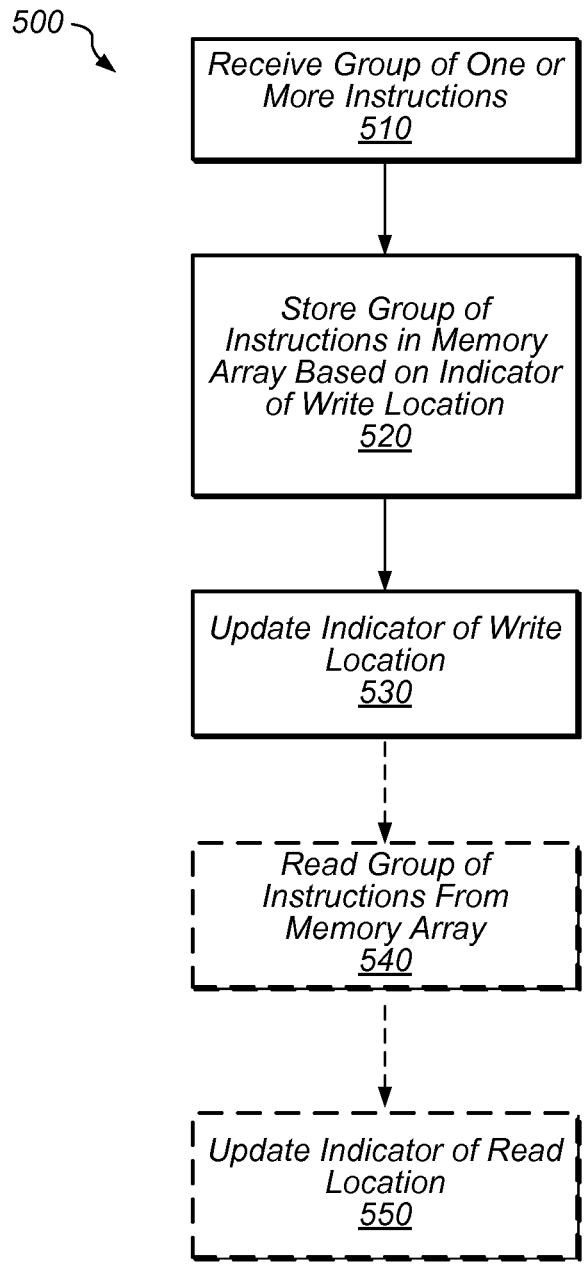
FIG. 5 is a flow chart illustrating a method of receiving instructions at a memory array.

Turning now to FIG. 5, a flowchart 500 is shown for a method of receiving instructions at a memory array. In step 510, a first group of one or more instructions corresponding to a given one of a plurality of threads supported by a processor are received by a group of one or more memory arrays. The one or more memory arrays may each have any or all of the features of memory array 110 as described above, and may be present in an instruction buffer such as 100, 300, or 400 in various embodiments. In embodiments where the group of memory arrays includes two or more memory arrays (and the instructions received include two or more instructions), the group of memory arrays may be operated together in (e.g., as in the manner described above with respect to arrays 302-308).

In step 520, the first group of one or more instructions is stored at one or more storage locations within the one or more arrays based on an indicator of a write location for the thread corresponding to the instructions. This indicator may be a next-write pointer as described above with respect to control information 150 and/or 350, or may be other information usable to determine a location into which the one or more received instructions will be stored. The one or more locations that store the one or more instructions are entries as described above with respect to memory array entry 120 and/or 200 in some embodiments. In one embodiment, storing the received one or more instructions includes, in a same clock cycle of a processor, storing a first instruction in a first one of the one or more memory arrays and storing a second instruction in a second one of the one or more memory arrays. In other embodiments, storing the received one or more instructions includes storing multiple instructions in each of one or memory arrays in one clock cycle, and in other embodiments, said storing may also include storing three or more instructions respectively in three or more memory arrays. Storing one or more instructions may take multiple clock cycles in some embodiments.

In step 530, responsive to storing the first group of one or more instructions, the indicator of the write location for the thread corresponding to the instructions is updated. In some embodiments, updating this write indicator includes updating one or more pointers into the one or more memory arrays. For example, the write indicator may be updated to reflect a next memory array (bank) and a next (or current) row within that bank to which a next incoming instruction for that thread should be stored. In another embodiment, the pointer may simply be updated to reflect a next row that spans a plurality of memory arrays, and that write pointer of the next row may be used in combination with an address of the next incoming instruction to determine which one of the plurality of memory arrays (banks) to which that next instruction should be stored (for example, the least four significant bits of the addresses for incoming instructions might be examined to determine whether a given instruction should be stored in a first, second, third, or fourth memory array).

In step 540, the first group of one or more instructions is read from the one or more memory arrays based on an indicator of a read location for a thread corresponding to those instructions. This indicator of a read location may be a next-read pointer as described above with respect to control information 150 and/or 350, or may be other information usable to determine a location from which one or more instructions will be read. In one embodiment, reading the one or more instructions includes, in a same clock cycle of a processor, reading a first instruction from a first one of the one or more memory arrays and reading a second instruction from a second one of the one or more memory arrays. In other embodiments, reading the one or more instructions includes reading multiple instructions from each of one or memory arrays in one clock cycle, and in other embodiments, said reading may also include reading three or more instructions respectively from three or more memory arrays. Reading one or more instructions may take multiple clock cycles in some embodiments.

In one embodiment, reading one or more instructions from one or more memory arrays includes reading a first instruction from a first storage location in a first one of the one or more memory arrays in a first clock cycle of the processor, and also includes reading a second instruction from a second storage location in a second one of the one or more memory arrays in a second, subsequent clock cycle of the processor. For example, in the embodiment of FIG. 1, an instruction could be read from memory array 110, entry 120B, in one clock cycle, and another instruction could be read from memory array 110, entry 120B, in a subsequent (e.g., next) clock cycle. In the embodiment of FIG. 3, instructions could be read from entries 120J and 120R in one clock cycle, and then read from entries 120Z and 120C in another subsequent clock cycle. In further embodiments, this second storage location may be determined based on the first storage location and on decode bit(s) 206 associated with an instruction read from the first storage location. In the embodiment of FIG. 3, for example, instructions may be read from either one or two entries 120 in a clock cycle, depending on the decode bit(s) for the instructions stored on those entries. Thus if instructions and decode bit(s) in entries 120A and 120B indicate both entries can be sent to SEL 190 in a same clock cycle, entry 120C (and possibly 120D) may be read from in a subsequent clock cycle. However if decode bit(s) for entry 120A or 120B indicate that one of those entries must be sent to SEL 190 individually, then entry 120B might be read in a subsequent clock cycle.

In step 550, responsive to reading the first group of one or more instructions, the indicator of the read location for the thread corresponding to the instructions is updated. In some embodiments, updating this read indicator includes updating one or more pointers into the one or more memory arrays. For example, the read indicator may be updated to reflect a next memory array (bank) and a next (or current) row within that bank from which a next-to-be-read instruction for that thread should be retrieved. In another embodiment, the read pointer may simply be updated to reflect a next row that spans a plurality of memory arrays, and that read pointer of the next row may be used in combination with an address of a last-read instruction to determine from which one of the plurality of memory arrays (banks) a next-to-be-read instruction should be retrieved (for example, the least four significant bits of the address for a last-read instruction might indicate that a particular bank stored the last-read instruction, and that a particular logically subsequent bank should thus be accessed for the next-to-be-read instruction).

EXEMPLARY SYSTEM EMBODIMENT

Figure 6:
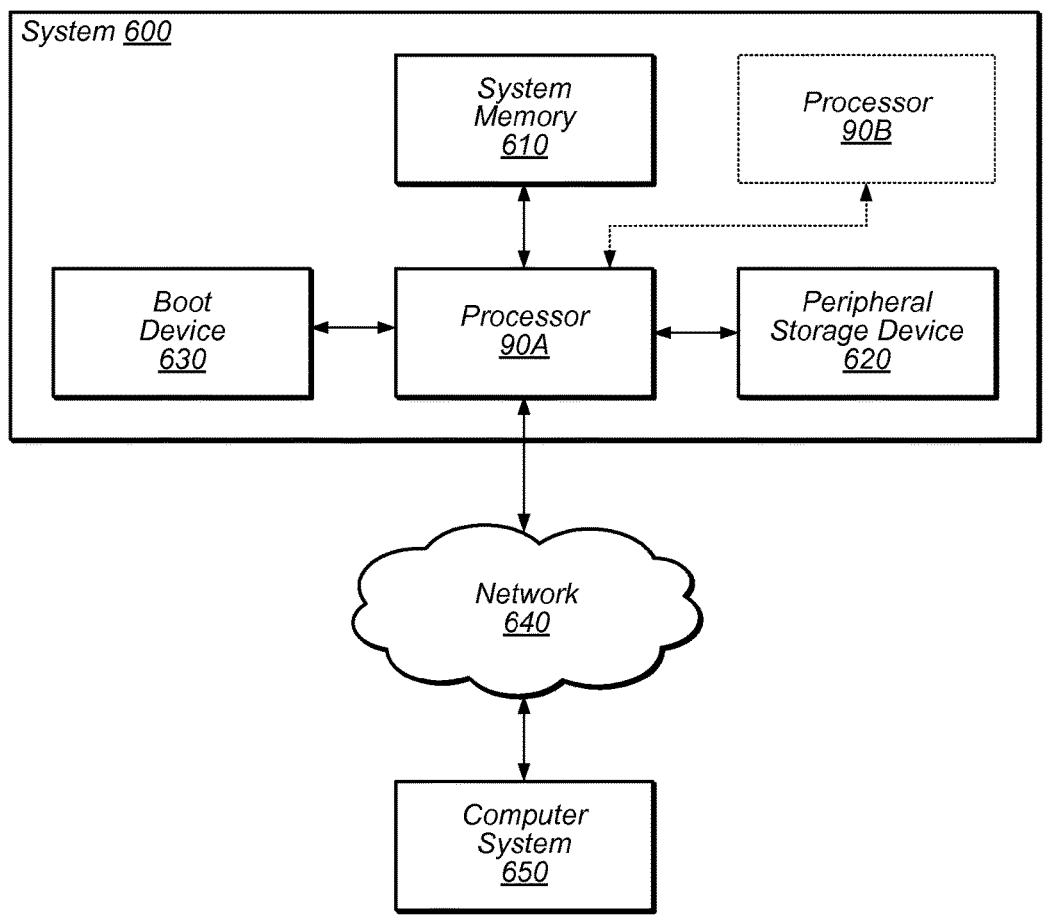
FIG. 6 is a block diagram illustrating an exemplary system embodiment.

Turning now to FIG. 6, an exemplary embodiment of a system is described below.

In some embodiments, processor 90A of FIG. 1 may be configured to interface with a number of external devices. In FIG. 6, one embodiment of a system including processor 90 is illustrated. In the illustrated embodiment, system 500 includes an instance of processor 90, shown as processor 90A, which is coupled to a system memory 610, a peripheral storage device 620 and a boot device 630. System 600 is coupled to a network 640, which is in turn coupled to another computer system 650. In some embodiments, system 600 may include more than one instance of the devices shown. In various embodiments, system 600 may be configured as a rack-mountable server system, a standalone system, or as any other suitable form factor. In some embodiments, system 600 may be configured as a client system rather than a server system.

In some embodiments, system 600 may be configured as a multiprocessor system, in which processor 90A may optionally be coupled to one or more other instances of processor 90, shown in FIG. 6 as processor 90B. For example, processors 90A-B may be coupled to communicate via respective coherent processor interfaces. Each of processors 90A and 90B may include one or more of any of the structures described above (e.g., instruction buffers, memory arrays, sets of control information, etc.)

In various embodiments, system memory 610 may comprise any suitable type of system memory as described above, such as FB-DIMM, DDR/DDR2/DDR3/DDR4 SDRAM, or RDRAM®, for example. System memory 610 may include multiple discrete banks of memory controlled by discrete memory interfaces in embodiments of processor 90 that provide multiple memory interfaces. Also, in some embodiments, system memory 610 may include multiple different types of memory. A portion or an entirety of a memory subsystem may comprise system memory 610 in various embodiments, and memory 610 may store instructions prior to those instructions being sent to IFU 180.

Peripheral storage device 620, in various embodiments, may include support for magnetic, holographic, optical, or solid-state storage media such as hard drives, optical disks, nonvolatile RAM devices, etc. In some embodiments, peripheral storage device 520 may include more complex storage devices such as disk arrays or storage area networks (SANs), which may be coupled to processor 90 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 90, such as multimedia devices, graphics/display devices, standard input/output devices, etc. In one embodiment, peripheral storage device 620 may be coupled to processor 90 via peripheral interface (s).

In one embodiment a boot device 630 may include a device such as an FPGA or ASIC configured to coordinate initialization and boot of processor 90, such as from a power-on reset state. Additionally, in some embodiments boot device 630 may include a secondary computer system configured to allow access to administrative functions such as debug or test modes of processor 90.

Network 640 may include any suitable devices, media and/or protocol for interconnecting computer systems, such as wired or wireless Ethernet, for example. In various embodiments, network 640 may include local area networks (LANs), wide area networks (WANs), telecommunication networks, or other suitable types of networks. In some embodiments, computer system 650 may be similar to or identical in configuration to illustrated system 600, whereas in other embodiments, computer system 650 may be substantially differently configured. For example, computer system 650 may be a server system, a processor-based client system, a stateless "thin" client system, a mobile device, etc. In some embodiments, processor 90 may be configured to communicate with network 640 via network interface(s).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   a pipeline having an instruction selection unit and a plurality of execution units, wherein the instruction selection unit is located before the plurality of execution units in the pipeline and is configured to select instructions to be executed by the plurality of execution units;
   an instruction buffer configured to store instructions for a plurality of threads, wherein the instruction buffer is configured to receive incoming instructions from an instruction fetch unit and is configured to provide outgoing instructions to the instruction selection unit, and wherein the instruction buffer includes a plurality of memory arrays that include a plurality of entries, wherein each of the plurality of entries is configured to store instructions executable by the processor;
   wherein the processor is configured to:
      determine a starting one of the plurality of memory arrays to store an instruction for one of the plurality of threads, wherein the starting memory array is determined based on a program counter value associated with the instruction; and
      maintain, for each of the plurality of threads:
         a first indicator that identifies one or more of the plurality of entries in which to store a group of one or more incoming instructions for that thread; and
         a second indicator that identifies one or more of the plurality of entries from which to read outgoing instructions for that thread; and
   wherein the instruction buffer is configured to perform, for multiple ones of the plurality of threads, reading from and writing to multiple ones of the plurality of entries; and
   a bypass circuit coupled to the instruction buffer, wherein the bypass circuit is configured to cause, during the same clock cycle, multiple incoming values for outgoing instructions to bypass the instruction buffer by forwarding the multiple values to the instruction selection unit, wherein the multiple values include a first value associated with a first of the plurality of threads and a second value associated with a second of the plurality of threads.

2. The processor of claim 1, wherein the processor is configured to use two or more of the plurality of memory arrays to selectively store a group of two or more incoming instructions from the instruction fetch unit.

3. The processor of claim 2, wherein respective portions of each one of the plurality of memory arrays are dedicated to storing entries for each one of the plurality of threads.

4. The processor of claim 2, wherein the processor is configured to use two or more other ones of the plurality of memory arrays to selectively store addresses corresponding to the group of two or more incoming instructions from the instruction fetch unit.

5. The processor of claim 1, wherein each of the plurality of entries is configured to store addresses corresponding to the instructions executable by the processor.

6. The processor of claim 1, wherein the processor is configured to maintain the first indicator for a given one of the plurality of threads by updating a respective one of a first plurality of pointers, wherein the updating is based on a quantity of instructions for the given thread that are received by the instruction buffer from the instruction fetch unit.

7. The processor of claim 6, wherein the processor is configured to maintain the second indicator for a given one of the plurality of threads by updating a respective one of a second plurality of pointers, wherein the updating is based on a quantity of instructions for the given thread that are sent from the instruction buffer to the instruction selection unit.

8. The processor of claim 1, wherein reading from the instruction buffer to provide one or more instructions to the instruction selection unit takes two or more clock cycles; and
wherein the processor is configured to begin reading a group of one or more instructions from the instruction buffer prior to each one of an earlier read group of one or more instructions being sent to the instruction selection unit.

9. An apparatus, comprising:
a pipeline having an instruction selection unit and one or more execution units, wherein the instruction selection unit is located before the one or more execution units in the pipeline;
an instruction buffer configured to:
  store instructions for a plurality of threads executable by a processor; and
  convey the stored instructions to the instruction selection unit, wherein the instruction selection unit is configured to select ones of the instructions for execution by the one or more execution units; and
a bypass circuit coupled to the instruction buffer;
wherein the instruction buffer includes a plurality of memory arrays, wherein each of the plurality of memory arrays includes a plurality of instruction entries, wherein each of the plurality of instruction entries is configured to store an instruction corresponding to one of the plurality of threads;
wherein the instruction buffer is configured to:
  determine a starting one of the plurality of memory arrays to store an instruction for one of the plurality of threads, wherein the starting memory array is determined based on a program counter value associated with the instruction; and
  maintain a first indicator for each of the plurality of threads, wherein the first indicator for a given one of the plurality of threads is usable to determine a first instruction entry in one of the plurality of memory arrays in which to store an instruction corresponding to the given thread that arrives at the instruction buffer from an instruction fetch unit; and
wherein the instruction buffer is configured to perform, for multiple ones of the plurality of threads, reading from and writing to multiple ones of the plurality of entries in a first one of the plurality of memory arrays; and
wherein the processor is configured to use the bypass circuit to forward multiple values from an input to the instruction buffer to an output of the instruction buffer during the same clock cycle, wherein the multiple values include a first value of a first instruction associated with a first thread and a second value of a second instruction associated with a second thread.

10. The apparatus of claim 9, wherein the instruction buffer is configured to maintain a second indicator for each of the plurality of threads, wherein the second indicator for the given thread is usable to determine a second instruction entry in one of the plurality of memory arrays, wherein the second instruction entry stores a next instruction to be sent to the instruction selection unit for the given thread.

11. The apparatus of claim 9, wherein the instruction buffer is configured to maintain the first indicator for each of the plurality of threads by updating a write pointer for that thread based on the instruction buffer previously receiving one or more instructions for that thread, wherein the write pointer indicates a location within one of the plurality of memory arrays.

12. The apparatus of claim 11, wherein the location within one of the plurality of memory arrays is a row.

13. The apparatus of claim 10, wherein the instruction buffer is configured to maintain the second indicator for each of the plurality of threads by updating a read pointer for that thread based on the instruction buffer previously reading one or more instructions for that thread, wherein the read pointer indicates a location within one of the plurality of memory arrays.

14. The apparatus of claim 10, wherein the apparatus is configured to determine the second instruction entry for the given thread based on the second indicator for that thread, a starting location of one or more previously read instructions for that thread, and feedback indicating the quantity of the one or more previously read for that thread.

* * * * *